United States Patent [19]
Fowell

[11] Patent Number: 5,758,846
[45] Date of Patent: Jun. 2, 1998

[54] SATELLITE SPIN INVERSION USING A SINGLE DEGREE OF FREEDOM MOMENTUM STORAGE DEVICE

[75] Inventor: Richard A. Fowell, Culver City, Calif.

[73] Assignee: Hughes Electronics Corporation, Los Angeles, Calif.

[21] Appl. No.: 816,727

[22] Filed: Mar. 13, 1997

Related U.S. Application Data

[63] Continuation of Ser. No. 430,636, Apr. 28, 1995.

[51] Int. Cl.$^6$ ........................................ B64G 1/28
[52] U.S. Cl. ........................ 244/165; 244/164; 244/176
[58] Field of Search .......................... 244/165, 164, 244/176, 3.21, 3.15; 364/459, 434

[56] References Cited

U.S. PATENT DOCUMENTS

| | | |
|---|---|---|
| 3,591,108 | 7/1971 | Perkel et al. . |
| 3,637,170 | 1/1972 | Paine . |
| 4,193,570 | 3/1980 | Hoffman et al. . |
| 4,275,861 | 6/1981 | Hubert . |
| 4,618,112 | 10/1986 | Keigler . |
| 4,961,551 | 10/1990 | Rosen . |
| 5,012,992 | 5/1991 | Salvatore . |
| 5,067,673 | 11/1991 | Fong . |
| 5,255,878 | 10/1993 | Rahn . |

OTHER PUBLICATIONS

J.J. Adams, "Study of an Active Control System for a Spinning Body", NASA TN D-905, Technical Note, Langley Research Center, VA, NASA, Jun. 1961, pp. 1-31.

J.J. Adams, "Simulator Study of an Active Control System for a Spinning Body", NASA TN D-1515, Langley Research Center, Dec. 1962, pp. 1-22.

M. Loebel; "Several Linear Stabilization and Reorientation Control System Configurations for a Rotating, Manned Orbital Space Station"; Academic Press, Guidance and Control-II; AIAA Guidance and Control Conference, Cambridge, Mass, Aug. 12-14, 1963; pp. 313-337.

N.H. Beachley and J.J. Uicker, Jr., "Wobble Spin Technique for Spacecraft Inversion and Earth Photography", Journal of Spacecraft, vol. 6, No. 3.; Mar. 1969, pp. 245-248.

T.R. Kane & M.P. Scher, "A Method of Active Attitude Control Based on Energy Considerations", J. Spacecraft; Engineering Notes, vol. 6, No. 5, May 1969, pp. 633-636.

J.U. Beusch and N.P. Smith, "Stable Equilibria of a Freely Spinning Satellite Containing a Momentum Wheel in a Controlled Gimbal", AIAA Guidance, Control and Flight Mechanics Conference, Santa Barbara, Ca, Paper No. 70-982, Aug. 1970, pp. 1-11.

(List continued on next page.)

*Primary Examiner*—Robert J. Oberleitner
*Assistant Examiner*—Tien Dinh
*Attorney, Agent, or Firm*—Terje Gudmestad; Michael W. Sales

[57] ABSTRACT

A method and system are disclosed for inverting a satellite spinning about a first desired spin axis to spin about a second desired spin axis substantially antiparallel to the first desired spin axis. A tumbling motion is induced in the satellite so that a spin axis of the satellite oscillates between the first desired spin axis and the second desired spin axis. The tumbling motion is induced by sensing at least one component of the angular rate vector and controlling a single degree of freedom momentum storage device based upon the at least one component of the angular rate vector. The single degree of freedom momentum storage device has an orientation of variation substantially perpendicular to the desired spin axis. The single degree of freedom momentum storage device is controlled so that the first desired spin axis is made an intermediate inertia axis of an effective inertia matrix. A capture point is detected at which the angular rate vector is sufficiently close to the second desired spin axis to be recaptured. After detecting the capture point, the single degree of freedom momentum storage device is controlled so that the angular rate vector substantially aligns with the second desired spin axis.

20 Claims, 3 Drawing Sheets

OTHER PUBLICATIONS

J.U. Beusch and N.P. Smith, "Stable Equilibria of Satellites Containing a Momentum Wheel in a Controlled Gimbal", Journal of Spacecraft, vol. 8–No. 7, Jul. 1971, pp. 736–742.

D.W. Childs, "A Movable–Mass Attitude–Stabilization System for Artificial–g Space Stations", Journal of Spacecraft, vol. 8–No. 8, Aug. 1971, pp. 829–834.

K.R. Lorrell and B.O. Lange, "An Automatic Mass–Trim System for Spinning Spacecraft", AIAA Journal, vol. 10, No. 8, Aug. 1972, pp. 1012–1015.

M.H. Kaplan & R. J. Cenkler, "Control of Spin Ambiguity During Reorientation of an Energy Dissipating Body", J. Spacecraft, vol. 10, No. 12, Dec. 1973, pp. 757–760.

I. Nakatani, "Spinning Satellite Attitude Control System Using Control Moment Gyro", Proceedings of the 11th International Symposium on Space Technology and Science, Tokyo 1975, pp. 781–787.

C. Hubert, "Spacecraft Attitude Acquisition form an Arbitrary Spinning or Tumbling State", J. Guidance and Control, vol. 4, No. 2, Mar.–Apr. 1981, pp. 164–170.

H. Yamamota, J. Aoyama, F. Kaju; "Improved Dual Spin Turn Attitude Acquisition for Momentum Biased 3–Axially Stabilized Spacecraft", Automatic Control in Space, Toulouse, France, 1985, pp. 91–95.

J. Weissberg & S. Ninomiya, "Improved Method for Initial Attitude Acquisition Maneuver" J. Guidance, vol. 10, No. 3, May–Jun. 1987, pp. 316–319.

M. Guelman, "On Gyrostat Dynamics and Recovery", Journal of Astronautical Sciences, vol. 37 , No. 2, Apr.–Jun. 1989, pp. 109–119.

Ott, E., et al.; "Controlling Chaos"; Physical Review Letters; vol. 64, No. 11; Mar. 12, 1990, pp. 1196–1199.

Ditto, W.L., et al.; "Experimental Control of Chaos"; Physical Review Letters; vol. 65, No. 26; Dec. 24, 1990.

C. Rahn & P. Barba, "Reorientation Maneuver for Spinning Spacecraft", J. Guidance, vol. 14, No. 4, Jul. –Aug. 1991, pp. 724–728.

H. Krishnan et al.; "Attitude Stabilization of a Rigid Spacecraft Using Momentum Wheel Actuators Operating in a Failure Mode" IAF–92–0035, Aug.–Sep. 1992; pp. 1–8.

H.D.I. Abarbanel, et al.; "The Analysis of Observed Chaotic Data in Physical Systems"; Rev. Mod. Phys.; vol. 65, No. 4; Oct. 1993; pp. 1331, 1378–1382, 1388–1390.

C.D. Hall, et al.; "Spinup Dynamics of Axial Dual–Spin Spacecraft"; J. of Guidance, Control and Dynamics; vol. 17, No. 1' Jan.–Feb. 1994, pp. 30–37.

M. H. Kaplan; "Modern Spacecraft Dynamics & Control"; John Wiley & Sons, May 1994, pp. 126–131 and 192–197.

J. McCanna, "Dynamic Imbalance Would Counter Offcenter Thrust"; NASA Tech Briefs; Nov. 1994; p. 86.

C.P. Jayaraman and B.P. Robertson, "Nutation and Precession Control of the High Energy Solar Physics (HESP) Satellite", AIAA, AIAA–93–3828–CP, pp. 1122–1132.

R.A. Abercrombie et al.; "An Active Nutation Damper for Spacecraft"; Goddard Space Flight Center pp. 139–151.

SATELLITE SPIN INVERSION USING A SINGLE DEGREE OF FREEDOM MOMENTUM STORAGE DEVICE

This is a continuation of application Ser. No. 08/430,636 filed Apr. 28, 1995.

TECHNICAL FIELD

The present invention relates generally to methods and systems for stabilizing the motion of a spacecraft, and more particularly, to methods and systems for stabilizing the rotation of a spacecraft about an intermediate inertia axis.

BACKGROUND OF THE INVENTION

The stability of the rotation of a spacecraft about a desired axis is of concern in many aerospace applications. For example, a transfer orbit spin of a satellite must be stable so that procedures such as attitude determination, thermal control, propellant management, fuel-efficient velocity increment maneuvers, command and telemetry linkage and solar power collection can be accurately performed. When the transfer orbit spin of a satellite is about an intermediate inertia axis, i.e., an axis having a moment of inertia thereabout less than the moment of inertia about a maximum principal axis, and greater than the moment of inertia about a minimum principal axis, the resulting spin is highly unstable. Specifically, a rapidly growing exponential divergence is produced in an uncontrolled intermediate axis spin, as opposed to the slowly-growing divergence which occurs in nutation.

Most geosynchronous communications satellites are of the body-stabilized momentum bias type, and have at least two momentum wheels for providing momentum stabilization on orbit. Such satellites are typically spin-stabilized during transfer orbit, spinning about an axis nearly perpendicular to their momentum wheels. They typically include at least two independent sets of 3-axis gyros to measure body rates to stabilize the satellite during thruster maneuvers during operation.

One solution for obviating the potential for instability is to avoid spinning about an intermediate inertia axis. This can be achieved by imposing constraints in the layout of the satellite in order to produce the desired inertia properties. However, the cost to meet these constraints is excessive as a result of having to produce the desired inertia properties in transfer orbit through deployments to the on-orbit configuration.

Another solution is to employ an active spin axis control system to stabilize the intermediate axis spin. U.S. Pat. No. 4,961,551 to Rosen discloses such a system which uses thrusters under active control with gyro rate sensing. This approach is disadvantageous in that irreplaceable propellant is consumed when using the thrusters, and further, the orbit and momentum of the satellite is disturbed by use of the thrusters.

U.S. Pat. No. 5,012,992 to Salvatore discloses a system for stabilizing intermediate axis spin which uses two momentum wheels and two gimballed momentum wheel platforms in a "vee wheel" configuration. The momentum wheels and platforms are employed to enhance the spin momentum and make the spin axis appear to have the maximum moment of inertia. A difficulty with this system results from deploying the momentum wheel platforms before the end of deployments, and possibly before the end of LAM firing. Typically, the momentum wheel platforms are delicate mission-critical mechanisms which are not designed to take the resulting deployment/LAM loads. Also, since both of the momentum wheels and platforms are utilized, the resulting system is not single fault tolerant.

SUMMARY OF THE INVENTION

The present invention provides a method of inverting a satellite spinning about a first desired spin axis to spin about a second desired spin axis substantially antiparallel to the first desired spin axis. The method includes a step of inducing a tumbling motion in the satellite so that a spin axis of the satellite oscillates between the first desired spin axis and the second desired spin axis. The tumbling motion is induced by sensing at least one component of the angular rate vector and controlling a single degree of freedom momentum storage device based upon the at least one component of the angular rate vector.

The single degree of freedom momentum storage device has an orientation of variation substantially perpendicular to the desired spin axis. The single degree of freedom momentum storage device is controlled so that the first desired spin axis is made an intermediate inertia axis of an effective inertia matrix.

The method further includes a step of detecting a capture point at which the angular rate vector is sufficiently close to the second desired spin axis to be recaptured. After detecting the capture point, the single degree of freedom momentum storage device is controlled so that the angular rate vector substantially aligns with the second desired spin axis.

The present invention further provides a system for inverting a satellite which performs the steps in the above-described method These and other features, aspects, and advantages of the present invention will become better understood with regard to the following description, appended claims, and accompanying drawings.

BEST MODES FOR CARRYING OUT THE INVENTION

The present invention stabilizes satellite spin using a single degree of freedom momentum storage device perpendicular to the spin axis, and information on the body rates transverse to the spin axis. The momentum wheels and gyros of a typical momentum bias satellite provide at least two independent sets suitable for this invention. Thus, the present invention can be used to stabilize the spin axis of such satellites during transfer orbit in a single-fault tolerant fashion. This invention can also be applied to satellites with other types of momentum storage devices (reaction wheel pyramids, control moment gyros, dual spin spacecraft) and sensors (e.g., linear or angular accelerometers, sun, moon, earth, star, radio beacon or GPS sensors).

Figure 1:
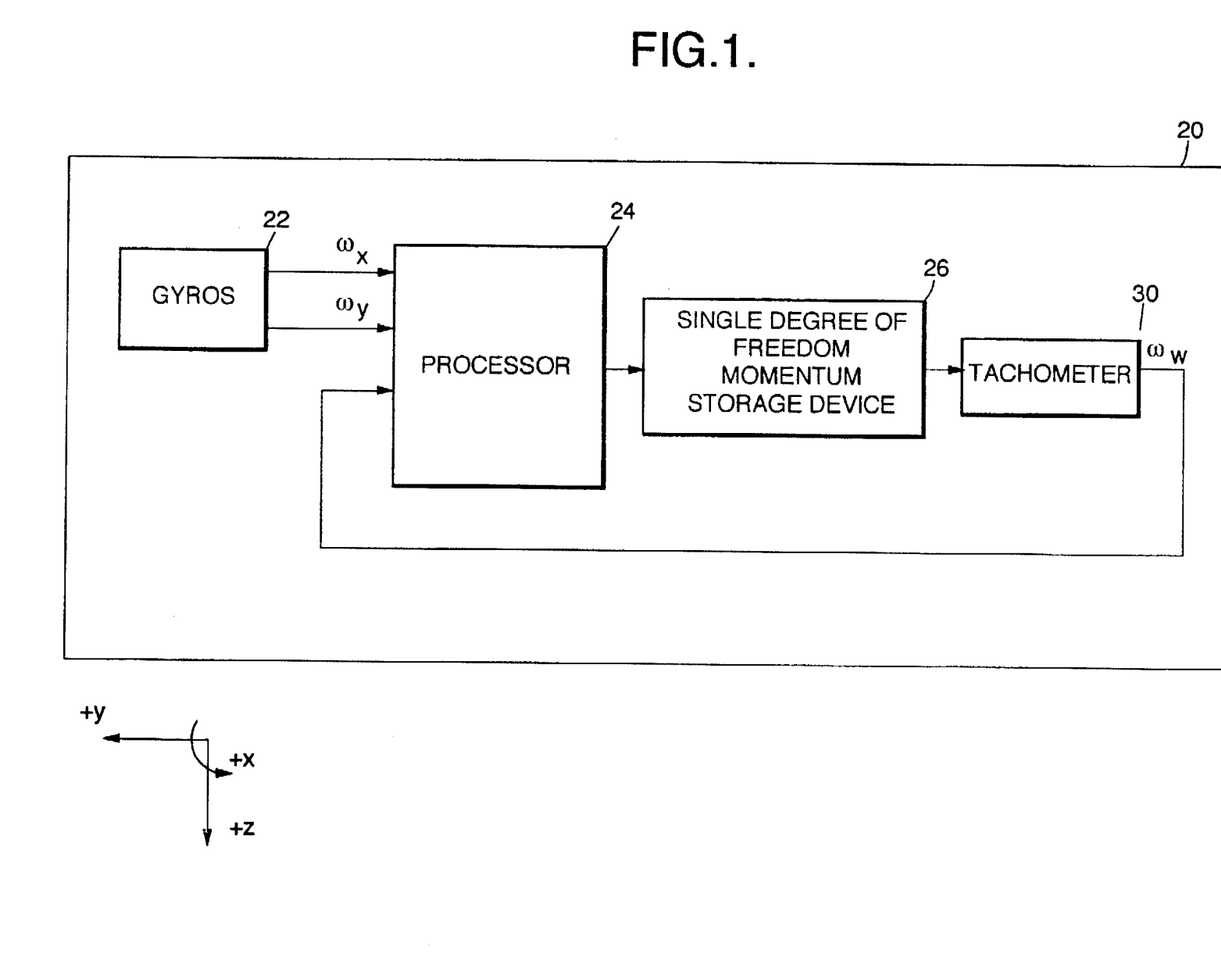
FIG. 1 is a block diagram of an embodiment of a system for satellite spin stabilization in accordance with the present invention.

An embodiment of a system for stabilizing the spin of a satellite 20 about an intermediate inertia axis is illustrated in FIG. 1. In order to aid in the description, the intermediate inertia axis of the satellite is assumed to be the Z axis, although other embodiments are not limited thereto. A set of gyros 22, capable of measuring at least one component of the rotation rate of the satellite body, is mounted in the satellite. The gyros 22 produce a first electrical signal representative of a first component of the angular velocity of the satellite 20 about a first axis of the satellite 20, and a second electrical signal representative of a second component of the angular velocity about a second axis of the satellite 20. The first axis and second axis are selected to be transverse with respect to the intermediate inertia axis, and are further transverse with respect to one another. In a preferred embodiment, the first axis, the second axis, and the intermediate inertia axis are mutually orthogonal; hence, the first axis corresponds to the X axis and the second axis corresponds to the Y axis.

It is noted, however, that a single gyro may also be utilized to sense a single component of the angular velocity of the satellite about a single sensing axis transverse to the intermediate inertia axis. The single gyro may be mounted for controllable rotation in order to sense any desired component in the plane perpendicular to the intermediate inertia axis.

The first electrical signal and the second electrical signal, representative of components of the body inertial rotation rate about the X and Y axes, respectively, are applied to a spacecraft processor 24. The spacecraft processor 24 forms a control signal in dependence upon the first electrical signal and the second electrical signal. The control signal is applied to a single degree of freedom momentum storage device 26. The momentum storage device 26 has a fixed transverse orientation with respect to the intermediate inertia axis. For example, the momentum storage device 26 can comprise a momentum wheel oriented to store momentum parallel to the Y axis of the satellite. A tachometer 30 is coupled to the momentum storage device 26 in order to sense the rotation rate thereof. The tachometer 30 converts the rotation rate to an electrical signal, which is fed back to the spacecraft processor 24. With an appropriate control law performed by the spacecraft processor 24, the system acts to stabilize an intermediate inertia axis spin by actively controlling a transverse momentum.

One embodiment of a control law employed in the spacecraft processor 24 is based upon a linear dynamic model of the satellite. The equations of motion for this model are derived for a general body spinning about the Z axis, wherein the body has a transverse wheel spinning about the Y axis. Linearizing the equations of motion about the reference motion of pure spin about the Z axis and the wheel spinning at a zero rate produces a set of first order differential equations. The set of first order differential equations can be written in a standard matrix form as x=A x+B u, where x and u are column vectors, and A and B are matrices.

The column vector x, which is a state vector for the model, has eight components: $x_1, x_2, \ldots, x_8$. The variable $x_1$ represents the body rotation (in radians) about Z axis, referenced with respect to the nominal rotation due to the desired satellite spin. The variable $x_2$ represents the body rotation (in radians) about the Y axis. The variable $x_3$ represents the body rotation (in radians) about the X axis. It is noted that the X, Y, and Z axes are consistent with the third, second, and first rotations, respectively, of a 3-2-1 Euler rotation sequence. The $x_4$ variable represents the momentum wheel rotation (in radians) relative to the body, where the rotation of the momentum wheel is about the body Y axis. The variable $x_5$ represents the body rotation rate (in radians/second) about the Z axis, referenced with respect to the nominal rotation rate. The variable $x_6$ represents the body inertial rotation rate component (in radians/second) along the body Y axis. The variable $X_7$ represents the body inertial rotation rate component (in radians/second) along the body X axis. The variable $x_8$ represents the momentum wheel rotation rate (in radians/second) about the Y axis relative to the body.

In forming the A matrix, which is a plant matrix for the model, the following variables are employed. The nominal body spin rate about the Z axis is denoted by $\omega_s$. The body moments of inertia are denoted by $I_x$, $I_y$, and $I_z$. The moment of inertia of the wheel about the Y axis is denoted by $I_w$. Using these variables, the A matrix can be written as follows:

$$A = \begin{bmatrix} 00 & 0 & 01 & 0 & 0 & 0 \\ 00 & -\omega_s & 00 & 1 & 0 & 0 \\ 0\omega_s & 0 & 00 & 0 & 1 & 0 \\ 00 & 0 & 00 & 0 & 0 & 1 \\ 00 & 0 & 00 & 0 & 0 & 0 \\ 00 & 0 & 00 & 0 & a_{67} & 0 \\ 00 & 0 & 00 & a_{76} & 0 & a_{78} \\ 00 & 0 & 00 & 0 & a_{87} & 0 \end{bmatrix}$$

where:

$a_{67} = \omega_s(I_z - I_x)/I_y = -a_{87}$ $a_{76} = \omega_s(I_y + I_w - I_z)/I_x$ $a_{78} = \omega_s I_w/I_x$ $b_6 = 1/I_y$ $b_8 = -((1/I_y) = (1/I_w))$.

The column vector u, which is an input vector for the model, contains only a single component in this model. This component, denoted by a scalar value u, represents the torque acting along the body Y axis from the momentum wheel. The B matrix, which is an eight-element column vector in this model, can be written as follows:

$$B = \begin{bmatrix} 0 \\ 0 \\ 0 \\ 0 \\ 0 \\ b_6 \\ 0 \\ b_8 \end{bmatrix}$$

The following controllability analysis is performed in order to show that spin axis control is possible by controlling the torque acting along the body Y axis resulting from the momentum wheel. Based upon the A matrix and the B matrix, it can be concluded that the eight-state system model has a four-dimensional controllable subspace, and a four-dimensional uncontrollable subspace. It can be shown that the controllable and uncontrollable subspaces are spanned by the vectors given below:

$$\begin{bmatrix} X_1 \\ X_2 \\ X_3 \\ X_4 \\ X_5 \\ X_6 \\ X_7 \\ X_8 \end{bmatrix} = \begin{bmatrix} \Theta_Z \\ \Theta_Y \\ \Theta_X \\ \Theta_W \\ \omega_Z \\ \omega_Y \\ \omega_X \\ \omega_W \end{bmatrix} = \begin{bmatrix} 1 & 0 & 0 & 0 & 0 & 0 & 0 & 0 \\ 0 & 0 & H & 0 & 1/H & 0 & 0 & 0 \\ 0 & 0 & 0 & -H & 0 & 1/H & 1/H & 0 \\ 0 & 0 & 0 & 0 & 0 & 0 & 0 & 1 \\ 0 & 1 & 0 & 0 & 0 & 0 & 0 & 0 \\ 0 & 0 & 0 & I_{YP} & 0 & 1/I_{YP} & 0 & 0 \\ 0 & 0 & I_X & 0 & -1/I_X & 0 & 0 & 0 \\ 0 & 0 & 0 & I_W & 0 & 0 & 1/I_W & 0 \end{bmatrix}$$

|U1 U2 U3 U4| |C1 C2 C3 C4| where:

$H = I_y \omega_s$ is the nominal spin momentum, and $I_{yp} = I_y + I_w$ is the total satellite inertia about the Y axis.

The particular set of basis vectors shown above were chosen for their physical significance. It is further noted that all of the basis vectors chosen are mutually orthogonal except for C2 and C3, which are clearly linearly independent.

Interpretation of uncontrollable columns U1, U2, U3, and U4 is as follows. Since row 5 of both the A matrix and the B matrix is zero, the value of $x_5$ cannot change. Hence, $x_5$ is an uncontrollable variable, as shown by the uncontrollable column U2. The only entry in row 1 of the A matrix and the B matrix is the element $a_{1,5} = 1$. Thus, $x_1$ is simply the integral of $x_5$. Since $x_5$ is identically zero, the value of $x_1$ does not change. Hence, $x_1$ is also an uncontrollable variable, as shown by the uncontrollable column U1. Uncontrollable column U3 represents the body X component of angular momentum. This quantity is clearly uncontrollable by internal torquing. Uncontrollable column U4 represents the body Y component of angular momentum. This quantity is also clearly uncontrollable.

It is again noted that the variable $x_1$ represents a perturbation from the nominal trajectory, which is a spin at a rate of $\omega_s$ about the Z axis. The fact that the nominal trajectory has nonzero rotational angles and rates about Z emphasizes the need for care when interpreting the variables $x_1$ and $X_5$.

Under the assumption of a linear model, the controllable columns C1, C2, C3, and C4 define a subspace within which the system can be driven to any location by torquing the momentum wheel. This conclusion is somewhat tempered in practice by nonlinearities such as torque limit in the momentum wheel, and kinematic nonlinearities of large angle excursions.

The controllable column C1 corresponds to an exchange of momentum along the body X axis between the body X rate and the body attitude, i.e. precession of the nominal spin momentum vector. The controllable column C2 corresponds to an exchange of momentum along the body Y axis between the body Y rate and the body attitude, i.e. precession of the nominal spin momentum vector. The controllable column C3 corresponds to an exchange of momentum along the body Y axis between the wheel relative rate and body attitude, i.e. precession of the nominal spin momentum vector. The controllable column C4 corresponds to the position of the momentum wheel, which also can be controlled.

Given the controllable subspace, the next step is to formulate a control objective. In a first embodiment, the objective may include an attempt to hold $x_2$ and $x_3$ at predetermined desired values. In a preferred embodiment, the objective is to drive $x_6$ to zero, $X_7$ to zero, and $x_8$ to zero. These quantities can be directly measured by the system in FIG. 1, namely the gyros 22 measure $x_6$ and $X_7$, and the tachometer 30 measures $x_8$. In general, an observability analysis can be performed to show which quantities can be measured for any given set of sensors.

In the case of the Z axis being the intermediate inertia axis, the open loop system described by the set of simultaneous first order differential equations is unstable. For this case, an eigenanalysis of the A matrix shows that there are real eigenvalues at:

$\pm \omega_s \sqrt{K_1 K_2}$ where $K_1 = (I_Y - I_Z)/I_X$ and $K_2 = (I_Z - I_X)/I_Y$.

According to linear systems theory, the negative eigenvalue is stable, while the positive eigenvalue is unstable. Hence, the purpose of the control law in this embodiment is to stabilize the unstable eigenvalue.

The unstable eigenvalue can be stabilized by commanding a wheel speed proportional to a transverse component of the angular velocity of the satellite, wherein the transverse component is in a direction based upon an eigenvector associated with the unstable eigenvalue. Paradoxically, this command results in a control torque whose step response initially increases the undesired transverse rates. This occurs because the corrective action is due to the changed wheel speed, and not due to the torque that changes the wheel speed.

Figure 2:
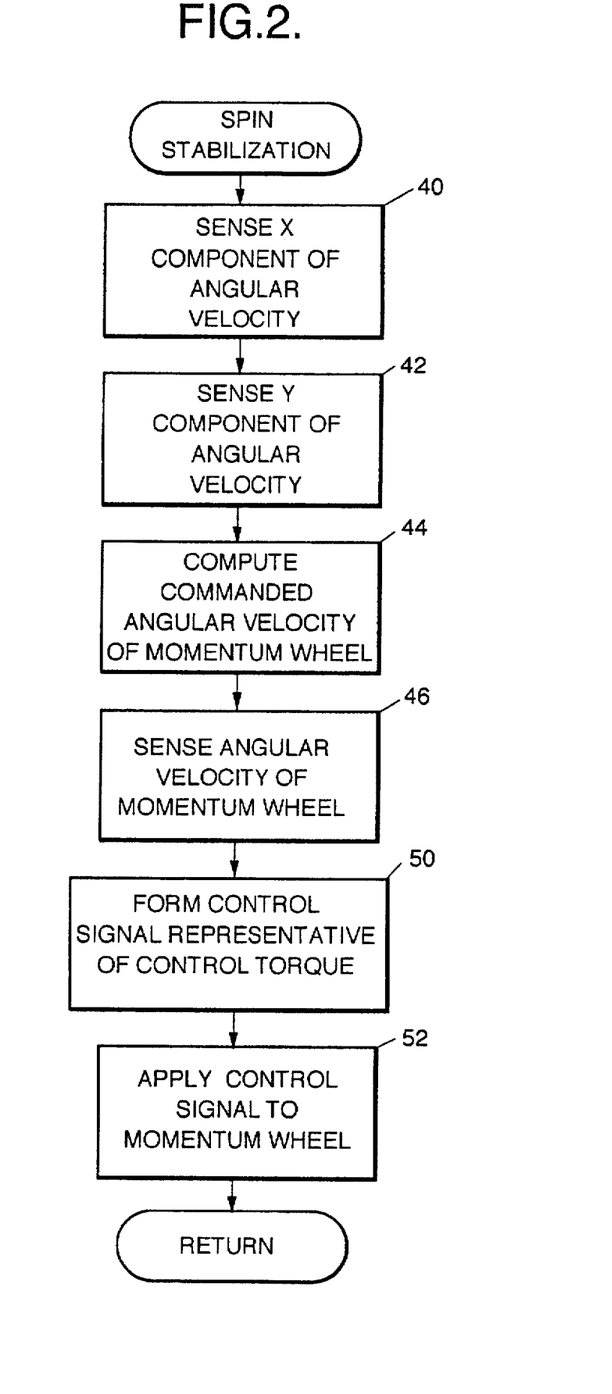
FIG. 2 is a flow chart of an embodiment of a method of satellite spin stabilization in accordance with the present invention.

A more detailed description of the control law is now given with reference to the flow chart in FIG. 2. A step of sensing the X component of the angular velocity of the satellite, represented by the state variable $X_3$, is performed in block 40.

Similarly, block 42 performs a step of sensing the Y component of the angular velocity of the satellite, which is represented by the state variable $x_2$. The steps performed in blocks 40 and 42 can be realized using the gyros 22. In block 44, a step of computing a commanded angular velocity for the momentum wheel 26 based upon the X component and the Y component of angular velocity is performed. The commanded angular velocity is simply a linear combination of the state variables $x_2$ and $X_3$. A gain constant associated with this linear combination is selected so that the resulting closed loop system is stable. The gain constant can be selected to produce desirable closed loop characteristics, e.g. the gain margin of the system can be maximized.

In block 46, a step of sensing the angular velocity of the momentum wheel is performed. This angular velocity corresponds to the $X_4$ state variable. A step of forming a control signal representative of a commanded control torque for the momentum wheel 26 is performed in block 50. The control torque is proportional to the difference between the sensed angular velocity of the wheel and the commanded angular velocity. The control signal is applied to the momentum wheel 26 by a step performed in block 52.

Other embodiments of control laws for use in the present invention are formulated as follows. The satellite can be modeled as a rigid body having a desired spin along an angular rate vector Q. The body-fixed axis of momentum variation is denoted as a unit vector b. The vector b denotes the bearing axis of the momentum storage device, such as a flywheel. The satellite may contain a fixed amount of angular momentum stored therein, represented by a vector g, which need not be parallel to b.

The actual body rates are expressed in the body frame by a 3×1 column vector, ω, and the difference between the actual and desired rates by a vector u:

$u = \omega - \Omega$

In one embodiment of the control law, the magnitude of the variable angular momentum in the body is controlled to be directly proportional to the body angular rate vector through a 3×1 weighting vector, f, so that the total internal angular momentum, h, is:

$$h = b\,f'\omega + g,$$

where f' denotes the matrix transpose of f. Defining the total satellite angular momentum as H, the satellite inertia matrix as I, and the vector of external torques as L, the satellite rotational equations of motion can be derived as follows.

$$L = d/dt(H)$$

$$L = d/dt(I\,w + h)$$

$$L = d/dt(I\,\omega + b\,f'\omega + g)$$

$$L = d/dt([I + b\,f']\omega + g)$$

This result shows that the rotational equations of the motion for the satellite body under this control law is that of a rigid body with inertia matrix [I+b f']. In other words, the effect of the control law is to modify the effective inertia matrix. This is a very powerful result for two reasons. First, it is a general, nonlinear result, applicable to large angle maneuvers, tumble recovery, and the like, as opposed to the usual linearized, small-angle theory used in satellite control. Second, the behavior of systems governed by the last equation is thoroughly studied, and well known in the art for the cases where [I+b f'] is a physically realizable inertia matrix. In such cases, this configuration is known as the "gyrostat" problem. "Spacecraft Attitude Dynamics", by Peter C. Hughes, devotes Chapters 3.5, 6 and 7 to this configuration, as well as an extensive bibliography. A bibliography of more recent work is in "Spinup Dynamics of Axial Dual-Spin Spacecraft", by C. D. Hall and R. H. Rand, J. GUIDANCE CONTROL, V17N1, Jan.–Feb. 1994, pp. 30–37.

Another point is that [I+b f'] can take on values that the inertia matrix of a rigid body cannot, which means that properties of the system for these cases are not readily tabulated and explained in the literature. These cases are of interest, since the standard gyrostat is not asymptotically stable for any spin orientation absent some mechanism for energy dissipation. In contrast, the "generalized gyrostat" equations given by the previous equation can be made asymptotically stable.

When the feedback is purely of the rate along the wheel axis, the effect is to augment or reduce the inertia of the system about that axis. Without loss of generality, the previous equation can be written in a reference frame such that b is directly opposed to the second basis vector, (b=[0 −1 0]') and f=[0 $f_2$ 0 ]'. Since f scales angular velocity to produce momentum, it has units of angular inertia:

$$\begin{bmatrix} L_1 \\ L_2 \\ L_3 \end{bmatrix} = \begin{bmatrix} I_{11} & I_{12} & I_{13} \\ I_{21} & I_{22}-f_2 & I_{23} \\ I_{31} & I_{32} & I_{33} \end{bmatrix} \begin{bmatrix} \omega_1 \\ \omega_2 \\ \omega_3 \end{bmatrix} + \begin{bmatrix} g_1 \\ g_2 \\ g_3 \end{bmatrix}$$

Note that this is the entirety of the effect of the feedback along the wheel axis. For the purpose of analyzing the effects of other feedback terms, the problem can be regarded as having been reduced to the problem with the updated inertia matrix. In the case where the wheel and the desired spin axes are along body principal inertial axes (the desired spin axis being the ±3 axis, without loss of generality), feedback along the wheel axis nominally solves the intermediate axis stabilization problem. By using this term to alter the inertia along the wheel axis, the inertia along the wheel axis can be moved to the same side of the spin axis inertia as the third principal inertia, making it equal to the third inertia. This converts the dynamics to those of major or minor axis spin, whichever the third inertia was to begin with.

Using the $f_2$ term to shift the transverse inertia value away from that of the spin inertia has many applications besides intermediate axis stabilization. For example, when the inertia about this axis is close to the spin inertia, the equilibrium spin direction in the body is more sensitive to undesired body inertia cross products, LAM torques, or other internal stored momentum. This undesired shift, or "wobble" is proportional to $1/(1-\sigma_2)$, where $\sigma_2$ is the ratio of the spin inertia to the inertia about the 2 axis. The result is that by choosing $f_2$ to shift the inertia away from the spin axis inertia, the system will become "self-balancing" in that axis. Since this effect is proportional, there will always be some tilt in response to such a disturbance—an integral term could be added to remove such effects entirely in the steady state.

Another application of the $f_2$ term is to invert satellites. Even if the 3 axis is major or minor, it can be made intermediate by the application of an $f_2$ gain designed to make it so. With this control alone, the satellite will immediately go into a tumbling motion where the spin axis in the body oscillates between the plus and minus 3 axis. When the spin axis is close enough to the inverted position to be recaptured, the gains can be changed back to stabilizing gains by on-board logic or ground command. Note that, for this approach, the capture point can be detected by looking for an extremum in the body rate about the 3 axis.

To see the effect of the $f_1$ term, a case where the spin axis is a principal axis perpendicular to the wheel axis, and L and g are zero is examined. Let the spin axis be the 3 axis and the wheel axis be the minus 2 axis. It is noted that a typical transfer orbit configuration for momentum bias, geosynchronous communications satellites is very close to this. Such satellites typically mount their momentum bias wheels at right angles to their LAM axis, and the satellite is spin-balanced so that the LAM axis (the spin, or 3 axis here) is a principal axis to one degree or less.

When the body is an intermediate axis spinner ($\sigma_1$ and $\sigma_2$ are on opposite sides of 1), the quantity under the radical is always positive and both roots are always real, one being always unstable. By using the $f_2$ term to make the spacecraft a major or minor axis spinner, the $f_1$ term can then be made to stabilize the system. The roots can be made both stable and real if desired to attain critical damping.

Even in the case where the satellite is also a major or minor axis spinner, but close to intermediate, using the $f_2$ term to make the satellite more of a major/minor spinner will help, since this will speed up the body nutation frequency, and allow for faster convergence.

Another use of the $f_2$ term in stabilizing nutation in major/minor axis spinners is to protect against the effects of wheel torque saturation on the wheel speed servo loop. If the spin speed and nutation angle are too large, the momentum wheel cannot follow the linear control law, and the wheel response will lag behind. Typically, this can approach as much as 90° of lag, and the (originally) $f_1$ feedback approaches pure $f_2$ feedback, which, as noted, is not effective at damping nutation, and the energy dissipative dedamping may take the system to flat spin. By including a large enough $f_2$ term in the linear control law to introduce phase lead into the system (e.g., twice the magnitude of the $f_1$ term), the behavior of the saturated system can be made to approach that of a pure $f_1$ system with unsaturated torque.

These equations also indicate another approach for inverting satellites. The $f_1$ term is stabilizing or destabilizing based on the product of its sign and that of the spin about the 3 axis. This means that if spin about the positive direction is stable, that about the negative direction is unstable, and vice versa. Situations where g is zero can be examined for undesired stable equilibria ("trap states") by noting that the eigenvectors of [I+b f'] are stationary points, and examining the stability of those six points (positive and negative direction for each of the cases) by linear analysis. Also, since the dynamic equations have only 3 state variables, and conservation of angular momentum provides one constraint, a phase map such as the polhode diagrams typically used to analyze these systems can be created and examined for any problems (whether or not g is zero). Momentum storage limits can be explicitly included in constructing these diagrams.

In the more general case, when the 3 axis is a principal axis but the wheel axis is not, a standard linearized controllability analysis can be done by linearizing the equations about the case of pure spin about the 3 axis, and expressing the results in terms of the angle between the wheel axis and one of the transverse principal axes.

The result of such an analysis is that spin about the 3 axis is stabilizable when the 3 axis is the major or minor inertia axis. When it equals one of the two transverse inertias, the system is stabilizable if the wheel is along the transverse inertia equal to the spin inertia, and uncontrollable if the wheel is perpendicular to that transverse inertia. Generally, in the case of spin about a principal, intermediate 3 axis, the transverse dynamics are controllable by modulating the wheel except for two angles. For one of these, the unstable real nutation root is uncontrollable, for the other, the stable real nutation root is uncontrollable. The latter is usually acceptable, since the system is stable, but the former is not. Note that when the sign of the spin about the 3 axis is reversed, these roles are reversed, as they are when the principal axis on the other side of the wheel axis. If the projected mission mass property sequence indicates that one of these conditions where the system is not fully controllable may be reached, two possibilities are to change the direction of the transfer orbit spin, or to arrange for a different orientation of transverse principal axes. For example, for Hughes HS601 spacecraft, the direction of the transverse principal axes is determined by which quadrants are loaded with fuel, and which with oxidizer, since their weights are significantly different. Interchanging their loading can eliminate the undesired mass properties condition.

It will now be shown that a satellite with rate sensing means (e.g., gyros) and the ability to store internal angular momentum in a fashion that is variable along at least one axis (e.g., the bearing axis of an internal wheel or external rotor) substantially transverse to the desired body spin axis can be used to stabilize spin to a degree not previously recognized. Useful applications include stable spin about highly unstable spin axes, such as the intermediate axis of inertia, global spin stability that will recover a tumbling satellite to spin about the desired axis in the desired spin sense, inversion maneuvers that reorient a spinning satellite 180° with as little as a single wheel controlled via a single-axis rate gyro, and automatic attenuation of the spin axis shift induced by internal imbalance or external thruster torques.

While alternate schemes will be demonstrated, much insight and utility can be gained by considering control laws that vary the stored momentum h along the control axis b in direct proportion to the satellite rate along a body fixed axis f, so that $h=b\ f^T\omega h_o$, with $\omega$-being the body rate and $h_o$ the fixed stored momentum. In this case, the satellite inertia matrix I is replaced in the equations of motion by an "effective inertia matrix", $J=[I+b\ f^T]$, whose properties can be usefully tailored via b and f.

The properties of this invention will be illustrated in terms of a simplified satellite dynamic model comprising a rigid portion (R), a controlled stored momentum ($H_w$) and the rest of the satellite (F) which may include a fixed bias momentum ($h_o$). Underlined quantities are vectors expressed in some frame fixed in R, by 3×1 column matrices. Some definitions are:

$$\underline{V}^x = \begin{bmatrix} 0 & -V(3) & V(2) \\ V(3) & 0 & -V(1) \\ -V(2) & V(1) & 0 \end{bmatrix}$$

L=external torque on satellite

H=total satellite angular momentum

I=satellite inertia expressed in the body frame (a 3×3 matrix)

$\omega$=the angular rate of R relative to an inertial frame b=the direction of the controlled momentum (e.g., wheel axis)

$h_o$=satellite internal momentum when $\omega$=0 f=vector of control gains $H_w=b\ f^T\omega$=controlled stored momentum under simple control $H_R=I\omega$=satellite angular momentum due to body rates $H_F$=angular momentum due to other internal motions (fixed angular momentum $h_o$, liquid slosh, flexing, etc.)

$h=H_w+h_o$=satellite internal momentum $\Omega$=a nominal value of $\omega$ $\lambda$=a nominal value of h $J=[I+b\ f^T]$=the "effective" inertia matrix.

Using the above-described terminology, it can now be shown why $J=[I+bf^T]$ is an effective inertia. From Newton's Law, it can be shown that:

$$L=d/dt(H)=d/dt(H_R+H_w+H_F)$$

$$L=d/dt(I\omega+b\ f^T\omega+H_F)$$

$$L=d/dt([I+b\ f^T]\omega+H_F)$$

$$L=d/dt(J\omega+H_F).$$

So, to the extent that the control system enforces $H_w=b\ f^T\omega$, the inertia matrix, I, is replaced in the equations of motion by J, the "effective inertia matrix", and this equivalence is true in a global, nonlinear sense. Judicious choice of f and b can produce a J that lacks undesirable properties of I. As in a previous example, define a frame fixed in R such that b is the first basis unit vector, $f^T=[f,0,0]$, $I_{ij}=0$ when $i \neq j$:

$$J=[I+\underline{b}f^T] = \begin{bmatrix} I_{11}+f_1 & 0 & 0 \\ 0 & I_{22} & 0 \\ 0 & 0 & I_{33} \end{bmatrix}$$

So, $f_1$ (feedback of body rate along the wheel axis) directly alters the effective '$I_{11}$'. If the satellite is to spin about the "3" axis, but $I_{22}<I_{33}<I_{11}$ (e.g. an intermediate axis spin which is highly unstable), a sufficiently negative value of $f_1$ ensures $I_{22}<I_{11}+f_1<I_{33}$, which is a "major axis spin"—a stable case assuming energy dissipation. When $I_{11}<I_{33}<I_{22}$, we can choose $f_1$ so $I_{33}<I_{11}+f_1<I_{22}$: "minor axis spin".

Some novel properties of $J=[I+bf^T]$ are now discussed. The eigenvalues, or the "principal inertias" of a physically realizable inertia matrix, I, meet certain constraints. If the three principal inertias are X, Y, Z, the constraints are:

X, Y, Z are all positive real numbers, and $Z+X>Y$, $X+Y>Z$, $Y+Z>X$ (the triangle inequality).

However, the eigenvalues of J need not satisfy these constraints. Furthermore, it will be shown that violating the constraints can be useful. In particular, it can be shown that:

intermediate axis spin can be stabilized by driving the smallest principal inertia negative, intermediate axis spin can be stabilized by making the transverse principal inertias a complex pair, and driving the transverse principal inertias to a complex pair can make intermediate axis spin globally stable.

In the general case, one can choose b as the first basis vector without loss of generality. I as a full 3×3 matrix, and $f^T=[f_1 f_2 f_3]$. Then, the J matrix can be written as:

$$J = [I + \underline{b}f^T] = \begin{bmatrix} I_{11}+f_1 & I_{12}+f_2 & I_{13}+f_3 \\ I_{21} & I_{22} & I_{23} \\ I_{31} & I_{32} & I_{33} \end{bmatrix}$$

To find equilibrium points and apply linear analysis, the nonlinear equations are expanded with $H_r=h_o$. By expressing $\omega=\Omega+u$ and $h=\lambda+v$ (where $\omega$, $\lambda$ are constant), the expression $L=d/dt(H)=H+\omega\times H$, where $H=I\omega+h$, becomes:

$$\underline{L} = [I\underline{b}] \begin{bmatrix} \dot{u} \\ \dot{v} \end{bmatrix} + [\Omega^x I - (I\underline{\Omega}+\lambda)^x\underline{\Omega}^x\underline{b}] \begin{bmatrix} u \\ v \end{bmatrix} +$$

$$\Omega^x(I\underline{\Omega} + \underline{\lambda}) + u^x(I\underline{u} + \underline{b}v)$$

For the control law of: $h=b^T\omega+h_o$:

$v=f^Tu$, $\lambda=b$ $f^T\omega+h_o$. Defining $J=[I+b\ f^T]$, the above equation becomes:

$0=J\dot{u}+[\omega^xJ-(J\omega+h_o)^x]u+[\omega^x(J\Omega+h_o)-L]+u^xJu$

When J is invertible, the pair ($\omega$, $h_o$) is an equilibrium point ($u=o\rightarrow\dot{u}=o$) if and only if $[\omega^x(J\omega+h_o)-L]=0$. A system with a stable equilibrium spin is desired. Linearizing the above equation at an equilibrium ($\omega,h_o$) pair yields:

$\dot{u}=-J^{-1}[\Omega^xJ-(J\Omega+h_o)^x]u$, or $\dot{u}=Au$

Cases have been simulated with $h_o\neq 0$ and $L\neq 0$ successfully, but for these examples the case $h_o=0$, $L=0$ will be used.

When $J^{-1}$ exists, $L=0$, $h_o=0$, and $||\Omega||\neq 0$, $\Omega$ is an equilibrium if and only if $\Omega$ is an eigenvector of J.

equilibrium $\rightarrow (\Omega^x(J\omega+h_o)-L-0\rightarrow\omega^xJ\omega-0\rightarrow J\omega$ parallel to $\omega$ $\rightarrow J\Omega-k\Omega\rightarrow\Omega$ is an eigenvector of J.

When $J^{-1}$ exists, $L=0$, $h_o=0$, $||\Omega||\neq 0$, $\Omega\times J\Omega=0$:

$\Omega$ asymptotically stable$\rightarrow-\Omega$ unstable $\Omega$ asymptotically stable and a complex eigenvalue of J exists$\rightarrow$spin about $\Omega$ is globally stable.

To see the first statement, note that now:

$\dot{u}=-J^{-1}[\Omega^xJ-(J\Omega)^x]u$, or $\dot{u}=Au$

Note that if spin about $\Omega$ is asymptotically stable, some of the eigenvalues of A must have negative real parts. But replacing $\Omega$ with $-\Omega$ changes the sign on A, and hence the signs of the real parts of its eigenvalues. Hence, for spin about $-\Omega$, the eigenvalues will have positive real parts, hence be unstable.

As for the second statement, if a complex eigenvalue of J exists, J has one real and two complex eigenvalues. Complex eigenvalues of J have complex eigenvectors, which cannot represent realizable angular rates. Hence, the only equilibrium spins are plus and minus spin about the eigenvector associated with the real eigenvalue of J. If spin of one sign is asymptotically stable, the other is unconditionally unstable, as shown above, and these are the only equilibrium spins. Hence, any initial spin can only settle at the stable equilibria. Phase plane plots show the absence of stable orbits and the like.

To show that a control law, (f, $h_o$), stabilizes a given system defined by (I, b, L) at a desired equilibrium spin direction, $\Omega$, it is necessary that at least two of the three eigenvalues of A have negative real parts. If the third eigenvalue has a zero real part, the system will be stable if $L=0$, by conservation of angular momentum. This is "local", or "linear" directional stability—it shows that if the system is initialized near the equilibrium, or is slightly disturbed from it, that it will return to that equilibrium.

While local stability suffices for many applications (most nutation control systems are only locally stable), it is desirable that the system be globally stable—that is, if the control was turned off and the satellite was allowed to tumble, it cannot be guaranteed that, when control is restored, the system will return to spinning about the desired $\Omega$. To show this, it is sufficient (though not necessary) to show that the desired equilibrium point is stable, and that all the other equilibrium spins are unstable.

Now some specific cases will be described. One case is when the spin axis and the wheel axis are mutually perpendicular, and aligned to principal axes of I. In this case, we can choose a body reference frame such that the spin axis is the "3" axis, the wheel axis the "1" axis, and I is a diagonal matrix:

$$J = [I + \underline{b}f^T] = \begin{bmatrix} I_{11}+f_1 & f_2 & f_3 \\ 0 & I_{22} & 0 \\ 0 & 0 & I_{33} \end{bmatrix}, \underline{\Omega} = \begin{bmatrix} 0 \\ 0 \\ \Omega \end{bmatrix} \underline{b} = \begin{bmatrix} 1 \\ 0 \\ 0 \end{bmatrix} f = \begin{bmatrix} f_1 \\ f_2 \\ f_3 \end{bmatrix}$$

For $\omega$ to be an equilibrium, $f_3=0$. Let $$J = \begin{bmatrix} X & f_2 & 0 \\ 0 & Y & 0 \\ 0 & 0 & Z \end{bmatrix}$$

Note that $f_1$ is subsumed into X.

When $k=0$, the three eigenvalues of A are:

$$0, \pm\Omega\sqrt{-\left(\frac{Z-Y}{X}\right)\left(\frac{Z-X}{Y}\right)}.$$

-continued $$\text{Let } m = \left(\frac{Z-Y}{X}\right), n = \left(\frac{Z-X}{Y}\right).$$

When f=0, and $\Omega \neq 0$, the system is directionally stable, with distinct imaginary roots, when mn>0. The directional stability holds despite the single pole at the origin. When mn≦0, however, there is either a pole in the right half of the complex plane, or at least two poles at the origin. In this "intermediate axis spin" case, the system cannot be stabilized by $f_2$ alone, as will be shown.

When f≠0 (f=[$f_1$, $f_2$, 0]$^T$), the poles of A are:
0, $\Omega(-r \pm \sqrt{r^2-mn})$, where
r=(Zf$_2$)/(2xy) is a normalized, dimensionless gain;
m=(Z-Y)/X
m=(Z-X)/Y When the open loop (f=0) case is neutrally stable (mn>0), it can be seen that any non-zero value of $f_2$ with the same sign as $\Omega$ makes the system asymptotically stable, and the system can even be made critically damped (all real roots) when $$r > \sqrt{mn}$$
$$(f_2 > (2XY/Z)\sqrt{mn}).$$

When mn≦0, however, the system is unstable no matter what (real) value $f_2$ has, there will either be a right half plane pole, or at least two roots at the origin. As a result, intermediate axis spin cannot be stabilized.

The solution for the intermediate axis case (mn≦0), is to use $f_1$ to alter X=$I_{11}$+$f_1$ so that mn>0, then apply $f_2$. If m≠0, then using $f_1$ to ensure the appropriate sign on n=(Z-X)/Y will do this. If n>0 is initially (X<Z<Y) we also have the option of making mn>0 by making m=(Z-Y)/X>0 by making X=$I_{11}$+$f_1$ negative. Making the smallest principal inertia negative in this fashion will usually be the easiest way to stabilize intermediate axis spin for a momentum-bias, body stabilized geosynchronous communications satellite in its on-station (deployed) configuration, since here the wheel is typically aligned to the minimum principal axis, whose value is much closer to zero than to that of the intermediate axis. Such intermediate axis spin may be desired for an acquisition slew or a long-term "safehold" spin about the sunline. Note that, in any case, $f_1$ in itself can only provide neutral stability—other means (such as $f_2$) must also be used to add asymptotic stability.

When m=0, neither $f_1$ nor $f_2$ help. This possibility may seem remote, but transfer orbit fuel consumption typically sweeps the spin inertia across a wide range. The remedy here is to ensure the wheel axis is not a principal axis.

Most satellites in transfer orbit can be accurately described as having the spin axis along a principal axis and the momentum wheel axis perpendicular to it. The satellite is typically carefully spin-balanced to make the spin axis principal, so the rocket motor aligned to it does not waste fuel by coning. The wheel axis is carefully aligned to be a perpendicular axis, but no effort is spent to make the wheel axis a principal axis in transfer orbit. For the Hughes HS601 communications satellites, the wheel is typically far from a principal axis in early transfer orbit since the heavier of the two propellent species is stored on the diagonal of the satellite.

For many missions, a range of intermediate axis spin cases must be stabilized. During transfer orbit, the spin to transverse inertia ratios change as fuel is expended, and the transverse principal inertias directions shift as well. When the configuration constraints that preclude transfer orbit intermediate axis spin in transfer orbit are lifted, it is not unusual for the spin axis to go from major to intermediate to minor axis during transfer orbit. Thus, it is highly desirable to have a control system which works throughout such a scenario.

Figure 3:
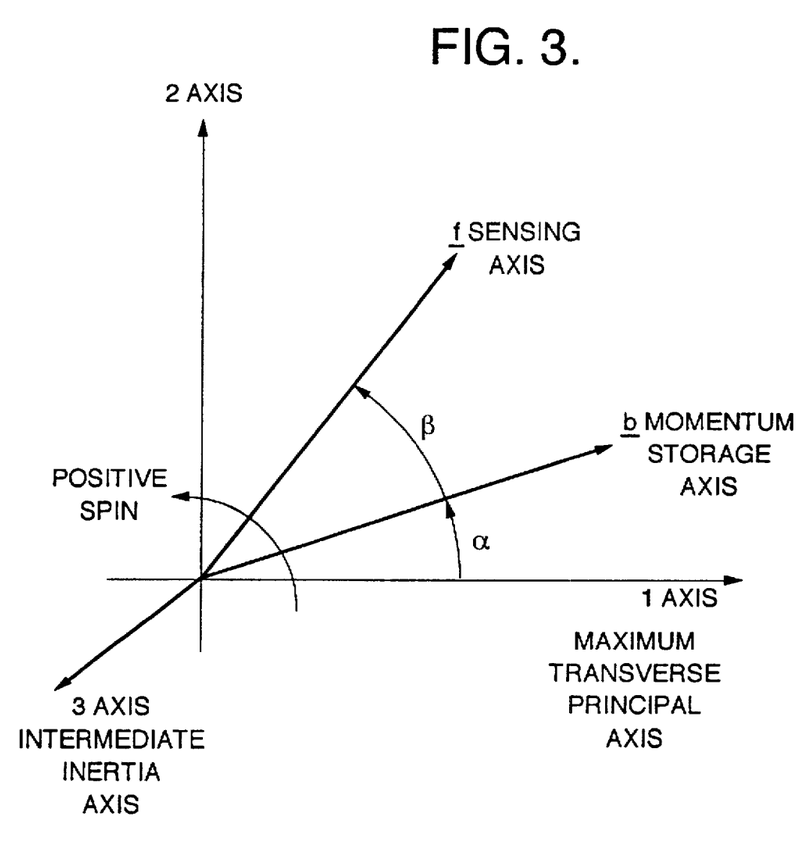
FIG. 3 illustrates the sensing axis and momentum storage axis used in an analysis of the present invention.

The ideal case that communications satellites in transfer orbit closely approach is that the spin axis is a principal axis, and the wheel axis is perpendicular to it. The spin principal axis is selected as the "3" axis, and the larger of the two transverse principal axes as the "1" axis, with the positive end of the "1" axis that is closest to the positive wheel axis. The angle from the "1" axis to the wheel is $\alpha$, and from the wheel axis to f is $\beta$ (note: $f_3$=0, since "3" axis spin is to be equilibrium). These selections are illustrated in FIG. 3.

It can be shown that (absent wheel constraints such as torque and momentum limits) for any $\alpha$ save one (the direction perpendicular to the eigenvector associated with the more stable root), a $\beta$ and a f can be found to stabilize it. As a practical matter, the range 0<$\alpha$<90° is easiest to stabilize, and note that the freedom to pick the sign of spin speed is very useful.

When the transverse inertias are unequal, and the spin inertia exactly equals one of them, the system is controllable if the wheel axis is not perpendicular to the axis whose inertia equals the spin inertia. This is understandable, since this means that we can effectively change the offending inertia by feeding back the body rate parallel to the wheel axis to wheel speed to make the system a major/minor axis spinner.

When all three inertias are equal, spin perpendicular to the wheel axis cannot be stabilized in this case. Other methods, such as an added bias momentum in the desired spin direction, are required.

When the spin axis is an intermediate axis, it is controllable when the wheel axis is not perpendicular to either of the open-loop transverse rate eigenvectors and stabilizable if the wheel axis is not perpendicular to the eigenvector associated with the most stable root (stabilizable since the uncontrollable root is already stable). Note that the controllability analysis assumes that feedback is unrestricted—generally feedback of the transverse rates parallel to the wheel rate as well as perpendicular to it will be necessary or desirable.

The root locus analysis shows that our simple control system—controlling the wheel speed proportional to a linear combination of the body rates parallel and perpendicular to the wheel, suffices to stabilize all cases that are controllable. Control laws that directly command wheel torque or acceleration could also be designed, and the conclusions of the controllability analysis would apply to them as well.

Feedback of rates parallel to the wheel are shown to simultaneously increase or decrease both effective transverse principal inertias without changing the effective spin inertia. Generally, the directions of these inertia axes shift as well. The dilemma of why a particular wheel axis is uncontrollable even though both effective transverse inertias can be shifted to be less than the spin inertia (normally major axis spin—neutrally stable) is resolved by showing that as the gain is raised, the smaller traverse inertia goes negative at the same point that the larger transverse inertia drops below the spin inertia. Either event alone would make the system neutrally stable, but together they cancel.

Feedback of rates perpendicular to the wheel change the effective transverse principal inertias in a differential sense, and can be used to cause them to coalesce and become complex numbers. As discussed earlier, it is desirable to make the effective transverse principal inertias complex, since this ensures that there are no undesirable spin equilibria that could be potential "traps" when recovering from an uncontrolled tumble. This property is independent of whether the system is minor, major or intermediate and relies on the wheel axis being sufficiently far from being principal axis and the feedback of the rate perpendicular to the wheel axis being sufficiently large.

The above described embodiments of the present invention have many advantages. First, an intermediate inertia axis spin of a satellite can be effectively stabilized without employing thrusters. As a result, the orbit and the momentum of the satellite is not disturbed by the spin stabilization methods and systems of the present invention, and furthermore, irreplaceable propellant is not consumed. Secondly, the use of gimballed momentum wheel platforms is not required since the momentum wheel is in a fixed transverse orientation with respect to the intermediate inertia axis.

Although presented in terms of a satellite, one having ordinary skill in the art will recognize that the disclosed methods and systems for spin stabilization can be applied to various types of spacecraft.

Further, it is noted that the present invention may be used in a wide variety of different constructions encompassing many alternatives, modifications, and variations which are apparent to those with ordinary skill in the art. Accordingly, the present invention is intended to embrace all such alternatives, modifications, and variations as fall within the spirit and broad scope of the appended claims.

What is claimed is:

1. A method of inverting a satellite spinning about a first desired spin axis to spin about a second desired spin axis substantially antiparallel to the first desired spin axis, the method comprising the steps of:

(a) inducing a tumbling motion in the satellite so that a spin axis of the satellite oscillates between the first desired spin axis and the second desired spin axis, the tumbling motion induced by sensing at least one component of the angular rate vector and controlling a single degree of freedom momentum storage device based upon the at least one component of the angular rate vector, the single degree of freedom momentum storage device having an orientation of variation substantially perpendicular to the desired spin axes, wherein the single degree of freedom momentum storage device is controlled so that the first desired spin axis is made an intermediate inertia axis of an effective inertia matrix;

(b) detecting a capture point at which the angular rate vector is sufficiently close to the second desired spin axis to be recaptured; and (c) after detecting the capture point, controlling the single degree of freedom momentum storage device so that the angular rate vector substantially aligns with the second desired spin axis.

2. The method of claim 1 wherein the single degree of freedom momentum storage device is controlled in step (c) so that the satellite has a stable equilibrium spin aligned substantially parallel to the second desired spin axis and an unstable equilibrium spin substantially parallel to the first desired spin axis.

3. The method of claim 1 wherein step (b) includes detecting an extremum in a body rate about one of the first desired spin axis and the second desired spin axis.

4. The method of claim 1 wherein sensing the at least one component of the angular rate vector includes:

sensing a first component of the angular rate vector along a first axis; and sensing a second component of the angular rate vector along a second axis, wherein the first axis and the second axis are substantially perpendicular to the second desired spin axis.

5. The method of claim 4 wherein the first axis is substantially perpendicular to the second axis.

6. The method of claim 4 wherein controlling the single degree of freedom momentum storage device includes:

processing the first component and second component to form a control signal; and applying the control signal to the single degree of freedom momentum storage device.

7. The method of claim 6 wherein the single degree of freedom momentum storage device includes a single degree of freedom momentum wheel having a bearing axis oriented substantially perpendicular to the second desired spin axis.

8. The method of claim 7 wherein the control signal commands a wheel speed of the single degree of freedom momentum wheel to be a sum of a nominal wheel speed, a product of the first component and a first predetermined gain, and a product of the second component and a second predetermined gain.

9. The method of claim 8 wherein after detecting the capture point, the first predetermined gain and the second predetermined gain are selected so that the effective inertia matrix of the satellite has two complex eigenvalues and a real eigenvalue, and so that an eigenvector associated with the real eigenvalue is substantially parallel to the second desired spin axis.

10. The method of claim 1 wherein the orientation of variation of the single degree of freedom momentum storage device is offset from a maximum principal axis of inertia of the satellite by at least 10 degrees.

11. A system for inverting a satellite spinning about a first desired spin axis to spin about a second desired spin axis substantially antiparallel to the first desired spin axis, the system comprising:

at least one gyro for sensing at least one component of the angular rate vector;

a single degree of freedom momentum storage device having an orientation of variation substantially perpendicular to the desired spin axes; and a processor coupled to the at least one gyro and the single degree of freedom momentum storage device, the processor operative to form a control signal based upon the at least one component of the angular rate vector and to apply the control signal to the single degree of freedom momentum storage device, wherein the control signal induces a tumbling motion in the satellite by making the first desired spin axis be an intermediate inertia spin axis of an effective inertia matrix so that a spin axis of the satellite oscillates between the first desired spin axis and the second desired spin axis, the processor further operative to detect a capture point at which the angular rate vector is sufficiently close to the second desired spin axis to be recaptured, and after detecting the capture point, to form the control signal so that the angular rate vector substantially aligns with the second desired spin axis.

12. The system of claim 11 wherein after detecting the capture point, the control signal is formed so that the satellite has a stable equilibrium spin aligned substantially parallel to the second desired spin axis and an unstable equilibrium spin substantially parallel to the first desired spin axis.

13. The system of claim 11 wherein the capture point is detected by detecting an extremum in a body rate about one of the first desired spin axis and the second desired spin axis.

14. The system of claim 11 wherein the at least one gyro includes a pair of gyros which sense a first component of the angular rate vector along a first axis and a second component of the angular rate vector along a second axis, wherein the first axis and the second axis are substantially perpendicular to the second desired spin axis, and wherein the processor processes the first component and second component to form the control signal.

15. The system of claim 14 wherein the first axis is substantially perpendicular to the second axis.

16. The system of claim 14 wherein the single degree of freedom momentum storage device includes a single degree of freedom momentum wheel having a bearing axis oriented substantially perpendicular to the second desired spin axis.

17. The system of claim 16 wherein the control signal commands a wheel speed of the single degree of freedom momentum wheel to be a sum of a nominal wheel speed, a product of the first component and a first predetermined gain, and a product of the second component and a second predetermined gain.

18. The system of claim 17 further comprising a tachometer which senses the wheel speed of the momentum wheel and provides the wheel speed to the processor.

19. The system of claim 18 wherein after detecting the capture point, the first predetermined gain and the second predetermined gain are selected so that the effective inertia matrix of the satellite has two complex eigenvalues and a real eigenvalue, and so that an eigenvector associated with the real eigenvalue is substantially parallel to the second desired spin axis.

20. The system of claim 11 wherein the orientation of variation of the single degree of freedom momentum storage device is offset from a maximum principal axis of inertia of the satellite by at least 10 degrees.

* * * * *